United States Patent [19]

Grabmaier et al.

[11] Patent Number: 5,560,867
[45] Date of Patent: Oct. 1, 1996

[54] PHOSPHOR WITH AN ADDITIVE FOR REDUCING AFTERGLOW

[75] Inventors: Christa Grabmaier, Berg; Hermann Boedinger, Puchheim; Juergen Leppert, Inning, all of Germany

[73] Assignee: Siemens Aktiengesellschaft, Munich, Germany

[21] Appl. No.: 505,663

[22] Filed: Jul. 21, 1995

[30] Foreign Application Priority Data

Jul. 29, 1994 [DE] Germany .................. 44 27 022.4

[51] Int. Cl.$^6$ .................................................. C09K 11/08
[52] U.S. Cl. .......................................... 252/301.45; 264/21
[58] Field of Search ........................ 252/301.45; 264/21

[56] References Cited

U.S. PATENT DOCUMENTS 4,733,088  3/1988  Yamada et al. .................. 250/483.1
5,296,163  3/1994  Leppert et al. .................... 264/21

FOREIGN PATENT DOCUMENTS 62-27487  2/1987  Japan .......................... 252/301.4 S

OTHER PUBLICATIONS

Hiromichi Yamada, et al., "A Scintillator $Gd_2O_2S$:Pr, Ce, F For X–Ray Computed Tomography", *J. Electrochem. Soc.*, vol. 136, No. 9, Sep. 1989.

*Primary Examiner*—Melissa Bonner
*Attorney, Agent, or Firm*—Hill, Steadman & Simpson

[57] ABSTRACT

A new and improved phosphor composition for a radiation detector is provided which includes a rare earth oxisulfide phosphor ceramic containing an afterglow reducing amount of an afterglow suppressant D, wherein D is at least one member selected from the group Zr, Ti, Hf, Se or Te.

12 Claims, No Drawings

PHOSPHOR WITH AN ADDITIVE FOR REDUCING AFTERGLOW

BACKGROUND OF THE INVENTION

The present invention relates to phosphor compositions and methods for making them which are useful for detection of high energy radiation in x-ray computer tomography systems and methods. More particularly, it relates to a new and improved rare earth oxisulfide-based phosphor composition exhibiting excellent luminous intensity and markedly reduced afterglow.

Detectors for the detection of high-energy radiation can be constructed of a phosphor and a photodiode or, respectively, a photomultiplier. Such detectors are widely employed in nuclear medicine and in X-ray diagnostics. The phosphor thereby has the job of absorbing the high-energy radiation and of emitting visible light as a consequence of this absorption. This visible light can be detected by a photosensitive element, for example a photodiode, a photomultiplier or a light-sensitive film.

In modern radiation detectors as employed, for example, in X-ray computer tomography, phosphors having extremely low afterglow or persistence are required in order to achieve an adequately high pulse frequency for the X-ray pulses. A widespread phosphor is thallium-doped cesium iodide CsI:Tl, which, for example, still exhibits an afterglow intensity of approximately $10^{-2}$ through $10^{-3}$ of the initial light intensity 20 msec after the high-energy radiation has been shut off. However, phosphors whose afterglow decays significantly faster are required for newer, next-generation radiation detectors.

The oxisulfides of the rare earth elements are promising phosphors for use in modern radiation detectors. DE 36 29 180 C2 discloses a method for the manufacture of a phosphor ceramic having the general composition $(Ln_{1-x-y}M_xCe_y)_2O_2S:X$ with Ln=Gd, La or Y; M=Eu, Pr or Tb and X=F or Cl with $0<x, y<1$. The pigment powder employed as starting material is placed in a vacuum-tight metal container and compressed into a ceramic by isostatic hot-pressing. The phosphors obtained in this way, however, exhibit an undesirably pronounced afterglow.

J. Electrochem. Soc., Vol. 136, No. 9, September 1989, pages 2713 and following, proposes a phosphor ceramic of a rare earth oxisulfide doped with cerium to reduce the afterglow. However, a colored phosphor ceramic whose light yield is reduced is obtained due to the cerium additive. The phosphor is thus degraded in terms of another important characteristic.

SUMMARY OF THE INVENTION

It is an object of the present invention to provide a new and improved phosphor composition based on a rare earth oxisulfide that exhibits an improved, i.e., reduced, afterglow without thereby sacrificing luminous intensity.

In accordance with this and other objects, the present invention provides a new and improved phosphor composition comprising: a rare earth metal oxisulfide having the formula $(M_{1-x}Ln_x)_2O_2S$, wherein M is selected from Y, La and Gd, Ln is at least one member of the group consisting of Eu, Pr, Tb, Yb, Dy, Sm and Ho, x is less than or equal to about $2\times10^{-1}$ and greater than or equal to about $1\times10^{-6}$ and an afterglow reducing amount of an afterglow suppressant D, wherein D is at least one element selected from the group consisting of Zr, Hf, Se, Te and Ti.

The present invention also provides a method for making a phosphor ceramic having reduced afterglow comprising the steps of:

providing a pigment powder composition having the general sum formula $M_{1-x-y}Ln_xD_y)_2O_2S$, wherein M is at least one element selected from the group consisting of Y, La and Gd, Ln is at least one element selected from the group consisting of Eu, Pr, Tb, Yb, Dy, Sm and Ho, D is at least one element selected from the group consisting of Zr, Hf, Se, Te and Ti and x has a value greater than or equal to $1\times10^{-6}$ and less than or equal to $2\leq10^{-6}$ and y has a value of greater than or equal to $1\times10^{-6}$ and less than or equal to $1\times10^{-1}$; and compressing the pigment powder under pressure at temperatures above about 1200° C. in an inert or reducing atmosphere to provide a phosphor ceramic.

In accordance with the present invention, it has now been surprisingly discovered that the incorporation of even relatively small amounts of an afterglow surpressant D, wherein D is at least one element selected from the group consisting of zirconium, titanium, selenium, tellurium and hafnium provides an unexpected reduction in the afterglow by even up to an order of magnitude. Compared to cerium, the previously known additive for reducing afterglow, no reduction of the light yield is observed with the new and improved phosphor compositions containing the afterglow surpressants in accordance with the present invention.

Other objects and advantages of the present invention will become apparent from the following Detailed Description of the Invention and illustrative working Examples.

DETAILED DESCRIPTION OF THE INVENTION

The new and improved afterglow surpressants of the present invention are effective to reduce the afterglow exhibited by rare earth oxisulfide-based phosphor compositions. The basic rare earth oxisulfide compositions for use in the present invention have the nominal or general sum formula $(M_{1-x}Ln_x)_2O_2S$, wherein M comprises at least one element selected from the group Y, La and Gd, Ln comprises at least one element of the group Eu, Pr, Tb, Yb, Dy, Sm and Ho, and $(2\times10^{-1})\geq x\geq(1\times10^{-6})$. Preferably, Ln is Tb, Pr or Eu.

It is suspected that the afterglow suppressant elements D in the phosphor indirectly reduces the number of anion voids. Since the latter generate "traps" or, respectively, deeply disposed conditions that intercept the charge carriers generated by X-rays and release them time-delayed, not only is the number of traps reduced with the invention, but the light yield or, respectively, the luminous intensity of the phosphor is also improved.

Since the inventive additive D to the phosphor differs in action from previously known additives for reducing the afterglow, the additive can be employed alone or in combination with other known additives for improving the luminous intensity or for reducing the afterglow.

In accordance with the present invention, the new and improved afterglow surpressant D may generally be added to the rare earth oxisulfide-based phosphor compositions in an amount of between about $2\times10^{-1}$ and about $1\times10^{-6}$ mol percent, preferably between about $1\times10^{-4}$ and about $1\times10^{-6}$ mol percent.

In accordance with the present invention, the new and improved phosphor composition is preferably processed into a high-density and translucent phosphor ceramic that can be utilized or employed in imaging methods, for example, in computer tomography.

The phosphor powder from which the phosphor or, respectively, the phosphor ceramic is fabricated may be prepared in accordance with traditional methods. For example, it is possible to manufacture the phosphor powder according to a flux process. To that end, the metals contained in the phosphor are provided in the form of oxides, carbonates, chlorides, fluorides, sulfides or other suitable compounds which are melted together with sulphur and a suitable fluxing agent such as an alkali compound. After the solidification of the melt, it is leached and washed in order to remove alkali compounds used as fluxing agent.

It is also possible to place the metals in solution in the desired ratio and to then precipitate them in a suitable way. To that end, for example, the rare earth oxides can be placed into solution as a hydrogen sulfite complex and can be precipitated as sulfite or, respectively, as sulfate. In a further step, a reduction of the sulfites or sulfates to the desired oxisulfides is then required.

The manufacture of the phosphor powder by precipitation from solution has the advantage that the afterglow suppressants, which are present in only a small effective amount or proportion, are uniformly distributed over the entire powder. Precipitation from solution guarantees the manufacture of a uniform phosphor ceramic with properties uniformly distributed over the ceramic body.

In still another modified method, the sulfite powder obtained by precipitation is reduced to the oxisulfide in a furnace under a forming gas atmosphere and is subsequently treated under a hydrogen-sulphur vapor atmosphere in a further temperature step. This process yields a phosphor powder that comprises no inclusions of foreign phases at all and that, in addition to comprising an exact stoichiometry, comprises a large surface area of more than 10 m$^2$ per gram (according to BET).

Before being further-processed into a phosphor ceramic, a phosphor powder with the inventive composition produced according to one of the above methods is first ground and potentially homogenized. For an imaging method, a suitable phosphor ceramic generally must comprise a high density of 96 percent and more with reference to the theoretically maximum density in order to have the required optical purity and translucence. This high density can be achieved, for example, by isostatic hot-pressing of the phosphor powder. To this end, the phosphor powder is placed into a gas-tight container made of a deformable metal. This container is then charged with a pressure between 50 and 200 MPa on all sides at a temperature of between about 800° and about 1700° C.

In a less complicated method, the phosphor powder can be processed into a high-density phosphor ceramic by single-axis hot-pressing. However, a phosphor powder that comprises a high surface area of more than 10 m$^2$/g according to BET is required for this purpose. Up to now, such a powder has only been capable of being obtained with the above-described process via the sulfite precipitation.

Further details of the compositions and methods of this invention will be apparent from the following Description of the Preferred Embodiment.

DESCRIPTION OF THE PREFERRED EMBODIMENT

Example 1

A phosphor powder having the gross composition $(Gd_{1-x-y} Pr_x Zr_y)_2 O_2 S$, whereby $x=1\times 10^{-3}$ and $y=2.5\times 10^{-5}$ was prepared corresponding to a phosphor composition of the earlier general formula wherein M=Gd, Ln=Pr and D=Zr.

More particularly, a suitable gadolinium compound, for example gadolinium oxide $Gd_2O_3$, was converted into the corresponding hydrogen sulfite complex in accordance with the following equation:

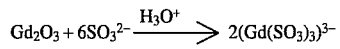

$$Gd_2O_3 + 6SO_3^{2-} \xrightarrow{H_3O^+} 2(Gd(SO_3)_3)^{3-}$$

Sulphur dioxide was introduced into the aqueous gadolinium suspension. A clear solution of the hydrogen sulfite complex was formed.

This solution was pumped through a 0.2 μm filter for particle removal. The dopant additives with respective to praseodymium and zirconium were added at this stage in the proper ratios prescribed by the formula. After addition, a solution or suspension of the corresponding oxides, sulfides, chlorides, nitrates, carbonates or of other suitable compounds of the metals or, respectively, dopants was formed.

The sulphur dioxide was then driven out of the solution, whereby the gadolinium together with the dopants is completely precipitated from the solution as sulfite, as follows:

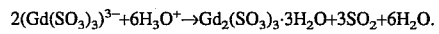

$$2(Gd(SO_3)_3)^{3-}+6H_3O^+ \rightarrow Gd_2(SO_3)_3 \cdot 3H_2O+3SO_2+6H_2O.$$

The entire process, especially the handling of the solid powder, was performed in an inert gas or in a reducing atmosphere in order to prevent an oxidation of the hydrogen sulfite complex or of the solid sulfite to the sulfate.

The dried gadolinium sulfite powder was heated to, for example, 700° C. in a reducing atmosphere, for example in forming gas having the composition 80 percent $N_2$/20 percent $H_2$. The gadolinium sulfite was thereby reduced to gadolinium oxisulfide $Gd_2O_2S$.

The reduction of the gadolinium sulfite may also be undertaken with other gasses having a reducing effect, for example by introducing carbon monoxide, hydrogen or a forming gas having some other composition. The temperature required for the reduction can also be selected from between about 400° and about 800° C. The phosphor powder obtained in this way has a desired, large specific surface area of, for example, 35 m$^2$/g. It can also comprise foreign phase inclusions that do not correspond to the indicated gross sum formula. This is especially observed when, in a version of the method, pure gadolinium sulfide is produced and is only subsequently mixed with suitable compounds of the dopants. For completion of the stoichiometry, a further reduction step can be implemented in this case, and the phosphor powder obtained is exposed to a hydrogen/sulphur vapor atmosphere. The same temperature conditions as in the first reduction step are thereby selected.

Phosphor ceramic wafers were then produced from the phosphor powders, for example by single-axis hot-pressing in an inert or reducing atmosphere, such as a forming atmosphere comprising 80%/20% $N_2/H_2$. To that end, the powder was filled into a press mold and was first pre-pressed cold and dry at a pressure of 50 MPa. Subsequently, heating up to a temperature of 1100 through 1300° C. was carried out in a hot press, initially pressure-less, whereby the phosphor powder sinters to approximately 80 through 85 percent of the theoretical density. Thereafter, pressure was generally increased upon the pressing power to approximately 50 MPa and the phosphor powder was completely compressed to form a phosphor ceramic.

The same methods employed in Example 1 were repeated with analogously produced phosphor powders wherein Zr is replaced by Ti, Hf, Se or Te.

The phosphor ceramic members removed from the mold were now charged with X-radiation under various conditions in order to quantitatively determine their luminous properties, particularly the afterglow.

The phosphor ceramic compositions of this invention exhibited afterglow intensities of $10^{-3}$ compared to the initial intensity after 4 ms. Compared to a "pure" $Gd_2O_2S$:Pr light-emitting ceramic, this was value represents that the afterglow was improved, i.e., reduced, by about one order of magnitude. The absolute light yield, by contrast, was improved by approximately 20% compared to a Ce-doped $Gd_2O_2S$:Pr light-emitting ceramic.

It thus turns out that a phosphor with the inventive additive of D exhibits an afterglow reduced by a number of orders of magnitude compared to the same phosphor without this additive. Given conditions that are otherwise the same, the corresponding, additive-free phosphor ceramic still exhibits an afterglow after said time interval that amounts to $10^{-2}$ times the initial luminous intensity.

Due to the improved luminous properties, the inventive phosphor is especially suited for use in a computer tomograph.

What is claimed is:

1. A phosphor ceramic composition comprising:
   a rare earth metal oxisulfide having the formula $(M_{1-x}Ln_x)_2O_2S$, wherein M is selected from the group consisting of Y, La and Gd, Ln is at least one member selected from the group consisting of Pr, Tb, Yb, Dy, Sm and Ho, and x has a value greater than or equal to $1\times10^{-6}$ and less than or equal to $2\times10^{-1}$, and from about $1.0\times10^{-6}$ to about $2.0\times10^{-1}$ mol percent of an afterglow suppressant D, wherein D is at least one member selected from the group consisting of: Zr, Hf, Se, and Te, said phosphor ceramic having a density of at least about 96% of theoretical maximum density.

2. A phosphor ceramic composition as defined in claim 1, wherein said afterglow suppressant D is present in said phosphor composition in an amount of from about $1.0\times10^{-4}$ to about $1.0\times10^{-6}$ mol percent.

3. A phosphor ceramic composition as defined in claim 2, wherein M is Gd, Ln is Pr and D is Zr.

4. A method for reducing afterglow of a rare earth oxisulfide-based phosphor composition which comprises adding an afterglow reducing amount of an afterglow suppressant D wherein D is at least one member selected from the group consisting of Zr, Hf, Se, and Te.

5. A method as defined in claim 1, wherein said afterglow reducing amount is from about $1.0\times10^{-6}$ to about $2.0\times10^{-1}$ mol percent of the phosphor composition.

6. A method for making a phosphor ceramic having reduced afterglow comprising the steps of:

providing a pigment powder composition having the general sum formula $(M_{1-x-y}Ln_xD_y)_2O_2S$, wherein M is at least one member selected from the group consisting of Y, La and Gd, Ln is at least one member selected from the group consisting of Pr, Tb, Yb, Dy, Sm and Ho, D is at least one member selected from the group consisting of Zr, Hf, Se, and Te, x has a value greater than or equal to $1\times10^{-6}$ and less than or equal to $2\times10^{-1}$ and y has a value of greater than or equal to $1\times10^{-6}$ and less than or equal to $1\times10^{-1}$; and compressing the pigment powder under pressure at temperatures above about 1200° C. in an inert or a reducing atmosphere to provide a phosphor ceramic.

7. A method as defined in claim 6, wherein said pigment powder composition is substantially homogenized prior to said compressing step.

8. A method as defined in claim 6, wherein said pigment powder composition is precipitated from solution.

9. A method as defined in claim 6, wherein said pigment powder composition has a surface area of at least about 10 $m^2/g$ determined by a BET method.

10. A method as defined in claim 6, wherein said compressing step is a single axis hot pressing.

11. A method as defined in claim 6, wherein said inert or reducing atmosphere is a forming atmosphere comprising 80%/20% $N_2/H_2$.

12. A method as defined in claim 6, wherein said pressure is about 50 MPa.

\* \* \* \* \*